United States Patent Office 3,839,402
Patented Oct. 1, 1974

---

3,839,402
PURIFICATION OF AROMATIC NITRILES
Richard V. Norton, Wilmington, Del., assignor to Sun Research and Development Co., Marcus Hook, Pa.
No Drawing. Filed Feb. 5, 1973, Ser. No. 329,941
Int. Cl. C07c 121/54
U.S. Cl. 260—465 H                6 Claims

ABSTRACT OF THE DISCLOSURE

In the process of recovering polynitrile products from the vapor phase ammoxidation of aromatic alkyl-substituted hydrocarbons, the improvement of providing purified polynitrile which comprises quenching said aromatic ammoxidation products in acetic acid held at a temperature between about 95° C. and about 140° C., preferably to obtain a solution of polynitrile in acetic acid which is less than 95% by weight of the saturation concentration, cooling the solution to a temperature no lower than about 60° C., and separating solid polynitrile product.

---

Aromatic polynitriles are an important commercial commodity because of their value as intermediates to numerous aromatic amines and aromatic carboxylic acids. In particular, polynitriles such as the phthalodinitriles and naphthodinitriles are employed as intermediates to their corresponding dicarboxylic acids which in turn are used in the manufacture of polyester fibers and films. These nitriles may also be hydrogenated to amines which are used in polyamide fibers and films.

Aromatic polynitriles may be prepared by the vapor phase ammoxidation of polyalkyl-substituted aromatic hydrocarbons, such processes being well known and disclosed in U.S. Pats. 2,828,325, 2,833,807, 2,838,558, and numerous others. In isolating the polynitrile products from such processes, it is important that high purity polynitrile be obtained because the ultimate aromatic polycarboxylic acid or amine obtained by hydrogenation must be of high purity in order to obtain a high molecular weight polymer therefrom. Thus, it is important to separate the polynitrile from any mononitrile, unreacted hydrocarbon, and other undesirable by-product formed during the ammoxidation. In the prior art techniques, the gaseous ammoxidation products are generally cooled, sometimes with direct water cooling and the solids treated by separate purification steps. U.S. Pat. 3,472,891 (Ikeda et al., issued Oct. 14, 1969 to Showa Denko) also discloses that the ammoxidation gases may be contacted with a solvent for high melting substances, but no specific solvent is mentioned nor is any separation and/or purification technique suggested. This invention provides a novel procedure whereby high purity aromatic polynitriles may be obtained from the vapor phase ammoxidation of alkyl-substituted aromatic hydrocarbons in an extremely efficient manner.

In accord with the invention, polynitrile products from the vapor phase ammoxidation of aromatic alkyl-substituted aromatic hydrocarbons are recovered by quenching the ammoxidation products in acetic acid held at a temperature between about 95° C. and about 140° C. to obtain a solution of polynitrile in acetic acid, cooling the solution to a temperature no lower than about 60° C., and separating solid polynitrile product.

It will be understood that the polynitrile ammoxidation products may be derived from any of the various vapor phase ammoxidation processes including those systems employing oxygen and those devoid of added oxygen. The process is operable with the ammoxidation products from a wide variety of polyalkyl-substituted hydrocarbons, but will preferably be used with polynitriles obtained by ammoxidation of polyalkyl benzenes and naphthalenes, and most preferably with a dialkyl-substituted benzene and naphthalene. The preferred process of the invention will employ dinitrile ammoxidation products such as isophthalonitrile, terephthalonitrile, o-phthalonitrile, 2,6-dicyanonaphthalene, 1,5-dicyanonaphthalene, 1,2,4,5-tetracyanobenzene (from durene), and the like.

The nitrile ammoxidation products are taken directly from the ammoxidation reactor after separation of any excess ammonia and fed by spraying, sparging, or the like to a vessel containing essentially anhydrous acetic acid held, preferably, at a temperature between about 95° C. and about 120° C. (the reflux temperature of the impure acid). If operated at reflux, the vessel will, of course, be equipped with appropriate condensing apparatus and water (and some acetic acid) will be taken overhead so as to maintain essentially anhydrous acetic acid for the quench. It is also useful to add acetic anhydride to the quench liquid from time to time as needed to ensure essentially anhydrous conditions for the quench liquid. When operated at temperatures above about 120° C., super-atmospheric pressures will be employed. A temperature of at least about 95° C. is required for the process in order to obtain polynitrile product of acceptable purity. In a preferred embodiment, the amount of nitrile fed into the acetic acid will be controlled so that the steady state polynitrile concentration in the acid is less than about 95% by weight of the saturation value at the particular quench temperature used. If the polynitrile concentration is permitted to be above this value, a less pure dinitrile product is often obtained as the process is difficult to control and premature crystallization may occur. The control of the polynitrile concentration to less than about 95% of saturation value is easly controlled by monitoring samples of the quench system by vapor phase chromatography which enables accurate concentrations of the system ingredients to be obtained. The polynitrile solution is then cooled in order to effect precipitation of the purified polynitrile, but the temperature of the cooled mass is maintained above 60° C. Then the polynitrile is separated by filtration or centrifugation in accord with known practices. It will, of course, be understood that the process may be operated in a continuous manner and such a technique is preferred for commercial operation. For continuous operation, an essentially steady state composition will be maintained, the rate of introduction of nitriles into the acid being equivalent to the rate of withdrawal of the solution which is taken for cooling and separation of the nitrile product by continuous filtration. Preferably, the cooling step will be carried out so that the lowered temperature is about 25° C. to about 60° C., preferably about 35° C., below the quench temperature, but in any event to a temperature not below about 60° C., because at below 60° C. mononitrile contaminates the desired polynitrile product. In a continuous process such as just described where the quench temperature is 120° C., a steady state flow of 2.3 pounds per minute of acetic acid enables the quenching of about 23 pounds of terepthalonitrile per hour.

After filtration, the acetic acid filtrate may be vacuum distilled to remove the mononitriles, unreacted hydrocarbon, and other by-products and the acetic acid is likewise recovered for reuse.

In order to further illustrate the invention, the following examples are given:

EXAMPLES I–V

The aromatic ammoxidation effluents shown in Table I are sparged into 500 ml. of refluxing acetic acid (about 120° C.) and the acetic acid solution is then cooled to the specified temperature and filtered to recover the purified nitrile product. The numerical values given in the table are more percent of nitriles in the effluent and recovered dinitrile.

the vapor phase ammoxidation of aromatic alkyl-substituted hydrocarbons, the improvement of providing purified polynitrile which comprises quenching said aromatic ammoxidation products in acetic acid held at a tempera-

TABLE I

|  | Example | | | | | | | | | |
|---|---|---|---|---|---|---|---|---|---|---|
|  | I | | II | | III | | IV | | V | |
|  | ¹A | ²B | ¹A | ²B | ¹A | ²B | ¹A | ²B | ¹A | ²B |
| Percent: | | | | | | | | | | |
| Isophthalonitrile | 48 | 95 | 38 | 96 | 0 | | 0 | | 0 | |
| Terephthalonitrile | 0 | | 0 | | 61 | 99 | 44 | 99 | 85 | 93 |
| Benzonitrile | 6 | 1 | 9 | 1 | 3 | 1 | 4 | 1 | 3 | 1 |
| m-Toluonitrile | 46 | 5 | 53 | 4 | 0 | | 0 | | 0 | |
| p-Toluonitrile | 0 | | | | 35 | 1 | 52 | 1 | 12 | 6 |
| Filtration temperature (° C.) | 63 | | 75 | | 83 | | 80 | | 50 | |
| G. of crude mixture per 100cc. of acetic acid | 113 | | 104 | | 24 | | 27.8 | | 17.6 | |
| Percent of saturation value | 94 | | 90 | | 95 | | 85 | | 99 | |
| G. of product recovered per 100 G. acetic acid | 44 | | 34 | | 10.1 | | 8.1 | | 15.7 | |

¹ Nitrile in effluent composition.
² Crystalline dinitrile product composition.

As can be seen from the above examples, the polynitriles are efficiently upgraded by the process of this invention in a single step. Thus, in Example I, effluent containing only 48% isophthalonitrile, 6% benzonitrile, and 46% m-toluonitrile is purified to 95% isophthalonitrile with significantly lower amounts of by-products. Likewise, in Example II, a similarly effective purification is achieved. Terephthalonitrile is similarly purified in Examples III and IV. Comparison of Example V with Example III shows the improved purification obtained at the higher filtration temperature (83° C.) as compared to the lower filtration temperature of Example V (50° C.) which also has a lower saturation value.

The invention claimed is:

1. In the process of recovering polynitrile products from the vapor phase ammoxidation of aromatic alkyl-substituted hydrocarbons, the improvement of providing purified polynitrile which comprises quenching said aromatic ammoxidation products in essentially anhydrous acetic acid held at a temperature between about 95° C. and about 140° C. to obtain a solution of polynitrile in acetic acid, cooling the solution to a temperature no lower than about 60° C., to precipitate polynitrile, and separating solid polynitrile product.

2. In the process of recovering polynitrile products from the vapor phase ammoxidation of aromatic alkyl-substituted hydrocarbons, the improvement of providing purified polynitrile which comprises quenching said aromatic ammoxidation products in acetic acid held at a temperature between about 95° C. and about 140° C. to obtain a solution of polynitrile in acetic acid which is less than 95% by weight of the saturation concentration, cooling the solution to a temperature no lower than about 60° C., to precipitate polynitrile, and separating solid polynitrile product.

3. The process of Claim 2 where the nitrile purified is a phthalonitrile.

4. The process of Claim 2 where the nitrile purified is a naphthonitrile.

5. The process of Claim 2 where the nitrile purified is isophthalonitrile.

6. The process of Claim 2 where the nitrile purified is terephthalonitrile.

References Cited
UNITED STATES PATENTS
2,487,298  11/1949  Bishop et al. _____ 260—465

LEWIS GOTTS, Primary Examiner
D. H. TORRENCE, Assistant Examiner

U.S. Cl. X.R.
260—465 C